(12) United States Patent
Hirtenreiter et al.

(10) Patent No.: US 7,672,010 B2
(45) Date of Patent: Mar. 2, 2010

(54) METHOD AND SYSTEM TO GENERATE DOCUMENT TEMPLATES WITH RESOURCE ADMINISTRATION

(75) Inventors: Klaus Hirtenreiter, Eching (DE); Hartwig Schwier, Munich (DE); Albin Stoderschnig, Munich (DE)

(73) Assignee: Oce Printing Systems GmbH, Poing (DE)

( * ) Notice: Subject to any disclaimer, the term of this patent is extended or adjusted under 35 U.S.C. 154(b) by 1471 days.

(21) Appl. No.: 10/702,321

(22) Filed: Nov. 6, 2003

(65) Prior Publication Data

US 2004/0130751 A1 Jul. 8, 2004

(30) Foreign Application Priority Data

Nov. 13, 2002 (DE) ................. 102 52 797

(51) Int. Cl.
*G06K 15/02* (2006.01)

(52) U.S. Cl. ............... 358/1.18; 358/1.11; 358/1.12; 358/1.15

(58) Field of Classification Search ............ 358/1.18, 358/1.12, 1.16, 1.9, 1.15, 1.11; 434/322; 707/517; 715/523
See application file for complete search history.

(56) References Cited

U.S. PATENT DOCUMENTS

| | | | | |
|---|---|---|---|---|
| 5,621,864 A * | 4/1997 | Benade et al. | ............. | 358/1.18 |
| 5,727,220 A | 3/1998 | Hohensee et al. | | |
| 5,963,968 A * | 10/1999 | Warmus et al. | ............. | 715/246 |
| 6,341,018 B1 * | 1/2002 | Vidyanand et al. | ......... | 358/1.18 |
| 6,490,695 B1 * | 12/2002 | Zagorski et al. | ............... | 714/38 |
| 6,650,433 B1 * | 11/2003 | Keane et al. | ................ | 358/1.15 |
| 7,007,231 B2 * | 2/2006 | Dang | .......................... | 715/213 |
| 7,130,068 B1 * | 10/2006 | Ohta | ......................... | 358/1.15 |
| 7,315,979 B1 * | 1/2008 | Walker | ....................... | 715/234 |
| 7,379,203 B2 * | 5/2008 | Kofman et al. | ............. | 358/1.18 |
| 7,415,669 B1 * | 8/2008 | Davidson et al. | ............ | 715/234 |
| 2002/0063891 A1 * | 5/2002 | Ueda et al. | ................ | 358/1.15 |
| 2002/0119433 A1 * | 8/2002 | Callender | ................... | 434/322 |
| 2002/0122205 A1 * | 9/2002 | Gauthier | .................... | 358/1.15 |
| 2002/0149792 A1 * | 10/2002 | Gauthier et al. | ............ | 358/1.18 |
| 2003/0103234 A1 * | 6/2003 | Takabayashi et al. | ...... | 358/1.15 |
| 2003/0107758 A1 * | 6/2003 | Fujiwara | .................... | 358/1.15 |
| 2003/0189726 A1 * | 10/2003 | Kloosterman et al. | ...... | 358/1.18 |
| 2004/0001189 A1 * | 1/2004 | Oka et al. | ..................... | 355/40 |

FOREIGN PATENT DOCUMENTS

DE 100 17 785 10/2001

OTHER PUBLICATIONS

Océ Ressourcen Generatoren Kapitel 13.

* cited by examiner

*Primary Examiner*—King Y Poon
*Assistant Examiner*—Allen H Nguyen
(74) *Attorney, Agent, or Firm*—Schiff Hardin LLP

(57) ABSTRACT

In a method and system for generating document templates for print jobs, in which a document template is generated in a generation unit using static resource data that are combined into addressable data sets. The document template is registered in a resource administration unit. The resource administration unit generates a resource list in which the resource data sets used by the document template are listed. Using the resource list, the resource administration unit controls a transfer of the used resource data sets to a data processing device in which the document template is supplemented with variable data, whereby the resource administration unit in turn can be controlled via a superordinate program.

19 Claims, 3 Drawing Sheets

METHOD AND SYSTEM TO GENERATE DOCUMENT TEMPLATES WITH RESOURCE ADMINISTRATION

BACKGROUND OF THE INVENTION

The present invention concerns a method to generate document templates for print jobs in which a document template is generated in a generation unit using static resource data that are combined into addressable data sets, in particular files. Furthermore, it concerns a system to generate print jobs with a generation unit in which the document template is generated using static resource data.

Document templates for print jobs are, for example, known from serial printing. The document template establishes the general layout of each document of the series to be printed and is combined with individual data, what are known as variable data, in order to generate the individual print documents of the series.

A typical example for a serial printing is the printing of account statements of a bank. The layout of the account statements would typically be predetermined in a document template: for example specific fields of the sheet would be predetermined in which variable data, such as the name of the customer, his account number, etc., as well as the font that should be used for this, are to be inserted.

When the account statement of a specific customer group should be printed out, the document template and the variable data are merged in a data processing device, and from this a print job is generated. The print job thus comprises variable data, such as for example the cited customer names and account numbers, and unchanging elements, such as for example fonts or standard texts. Such unchanging elements are typically called static resource data.

When the print job is transmitted from the cited data processing device to a printer, each resource data set only has to be transmitted to the printer once, and must otherwise only be cited in a specially prepared print data stream. Via the division of the print job into variable data and static resource data, the amount of data that must be transmitted to the printer is thus kept smaller, which is essential given the enormous processing speed of modern high-capacity printers.

DE 100 17 785 shows a method and a system to process a print data stream in which the detailed print data stream is sorted in a manner that is adapted to the further processing of the printed good (for example, binding or shipment). The print data stream is divided per document into variable data and static resource data. What are known as "inline resources", that are already comprised in the detailed print data stream, are thereby differentiated from what are known as "external resources" that are themselves not present in the detailed print data stream, but however which can be incorporated into the print data stream via referencing.

In addition to fonts and standard texts, typical resource data are forms, tables, graphic elements such as images or logos, however also layout templates for print pages and templates for the positioning of the printer pages of the recording medium. A more detailed specification of the printer with static resource data is found, for example, in the publication "Das Druckerbuch", Dr. Gerd Goldmann, 6th edition, May 2001, ISBN 3-00-001019-X in chapter 13, the content of which is hereby included by reference in the present specification.

In chapter 13 of this publication, a generation unit for document templates for print jobs is also specified that is formed via a combination of the programs "Smart Layout Editor", "Forms Generation Language" and "Océ Font Manager". With such programs, addressable resource data sets that can be accessed in a document template can be generated and processed.

The addressable resource data sets are typically files. All resource files that are used in a document template must be transferred to the data processing device in which the static resource data of the document template and the variable data are combined in order to complete the print job. When one of the resource files used by the document template is missing on the data processing device, the print job can not be executed, but rather the printer delays until the missing resource file is added.

SUMMARY OF THE INVENTION

It is an object of the present invention to specify a method and/or system that prevents an interruption of the print operation due to missing resource files.

In a method and system for generating document templates for print jobs, the document template is generated in a generation unit using static resource data that are combined into addressable datasets. The document template is registered in a resource administration unit. A resource list is generated by the resource administration unit in which resource datasets used by the document template are listed. Using the resource list, a transfer of the used resource datasets is routed to a data processing device in which the document template is supplemented with variable data.

DESCRIPTION OF THE PREFERRED EMBODIMENT

Figure 1:
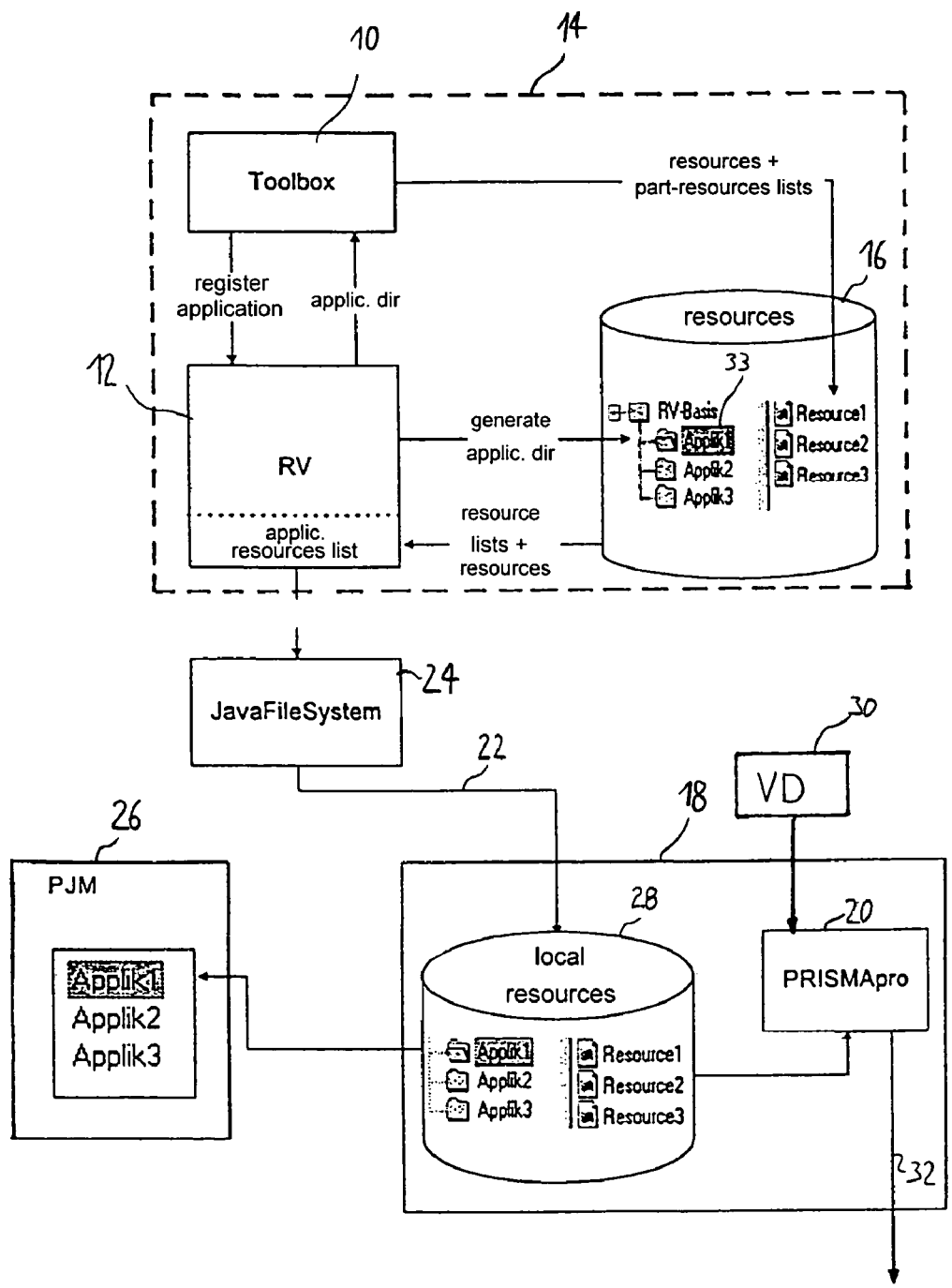
FIG. 1 illustrates a schematic representation of a system to generate document templates for print jobs.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

According to the preferred method, the document template generated in the generation unit is thus filed in a resource administration unit, a resource list is generated by the resource administration unit in which the resource data sets used by the document template are listed, and a transfer of the used resource data sets to the data processing device in which the document template is supplemented with variable data is controlled using the resource list.

Previously, the resource data sets used by a document template were typically manually transferred to the data processing device. However, it thereby often occurs that individual resource data sets were overlooked. This therefore occurs in particular because individual resource data sets often, for their part, access secondary resource data sets that can then be easily forgotten given the manual transfer. It is therefore begun, in the framework of the generation of the document template, to generate a resource list of the used resource data sets, with the help of which the transfer of all necessary resource files to the data processing device is then achieved after the completion of the document template.

To better understand the present invention, reference is made in the following to the preferred exemplary embodiment shown in the drawings, which is specified using specific terminology. However, it is to be noted that the scope of protection of the invention should not thereby be limited, since such changes and further modifications to the shown method and system, as well as such further applications of the invention as they are shown therein, are viewed as typical present or future expert knowledge of competent or average man skilled in the art.

A system according to the embodiment is schematically shown in FIG. 1. The system comprises a generation unit 10 (toolbox) and a resource administration unit 12 (RV) that are installed in the shown exemplary embodiment on a common personal computer (PC) 14 that is schematically shown via the dashed boxes. In the shown exemplary embodiment, the generation unit 10 is a combination of known programs to generate and process resource data, for example the programs "Smart Layout Editor", "Forms Generation Language" and "Océ Font Manager", that are more closely specified in chapter 13 of the publication "Das Drukkerbuch" cited above.

The resource administration unit 12 is formed in the shown exemplary embodiment via a service program, for example via a component object model server. The PC 14 has a storage, of which a partition 16 is administered by the resource administration unit 12.

Furthermore, a data processing device 18 is shown in FIG. 1 that is designed in the shown exemplary embodiment as a print server. The data processing device or, respectively, the print server 18 is likewise a PC on which a known print server software 20 is installed, for example the print server software "PRISMApro" by the company Océ. Particular details with regard to the properties and the function of such a print server 18 are found in chapter 14 of the "Druckerbuch" cited above, which likewise is included by reference in the present specification.

The PC 14 and the print server 18 are connected with one another via data lines 22. These data lines 22 can be formed via a local network (local area network LAN), a global network (wide area network WAN) or via the Internet. Although, to simplify matters, only a print server 18 is shown in FIG. 1, it is provided in the shown exemplary embodiment that a plurality of such print servers 18 are present that are connected via a common JAVA file system 24 via which the PC 14 has access to any one of the provided print servers.

Furthermore, a job editor 26 is shown in FIG. 1, also designated as a Print Job Manager (PJM). Via the job editor 26, print jobs (what are known as job tickets) can be generated at any terminal and transmitted to the print server 18 or to further print servers (not shown) present on the network.

In the following, a development of the method is explained using the exemplary embodiment. The generation of an AFP (Advanced Function Presentation) print application is specified therein. AFP designates a combination of licensed programs that use the APA (All Points Addressable) concept for printing of data on a plurality of printers. However, also designated with AFP is the corresponding print data language or the corresponding print data format. The AFP format is, for example, specified in the publication Nr. F-544-3884-01 by the company International Business Machines (IBM), with the title "AFP Programming Guide and Line-data Reference".

AFP uses static resource data sets of the type specified above. However, it is emphatically noted above that the method and/or system is not limited to applications in the AFP format. Rather, the method and/or system is also applicable given the use of other print data formats that use static resource data, for example "Postscript" (PS), "Printer Command Language" (PCL), "Line Condition Data Stream" (LCDS) and "Personal Print Markup Language" (PPMU). The specific properties of the AFP resources that are discussed in the following specification of a concrete exemplary embodiment are not significant, and should therefore not limit the scope of protection.

An AFP resource is a combination of print instructions and can moreover comprise data to be printed. AFP recognizes the following AFP resource types that should be briefly described.

The AFP resources "font character set", "code page" and "coded font" concern fonts. A "font character set" is a file that, among other things, comprises the raster pattern of fonts. A "coded page" is a file that assigns a character to each coding point of an 8-bit code word. Finally, the AFP resource "coded font" produces the connection between a "code page" and a "font character set".

The AFP resource "overlay" comprises a combination of static data, for example lines, shadings, text, borders or logos, that can be combined with variable data during the printing.

The AFP resource "page segment" comprises text and images and can be inserted at each addressable point of a page or of an "overlay".

The AFP resource "page definition" comprises formatting templates for the printing of logical data pages. The AFP resource "form definition" establishes, among other things, the "overlays" to be used, the paper source and the arrangement of logical pages on the paper.

In the following exemplary embodiment of a development of the method, an AFP print application is now generated in the generation unit 10 using individual AFP resources. The AFP resources can thereby access AFP resources subordinate to themselves. When, for example, a table is generated via the AFP resource "overlay", it can be established with which font the individual fields of the table are to be described. In this case, the AFP resources of the corresponding font are subordinate to the AFP resource "overlay". This "overlay" is, however, for its part subordinate to the AFP resources "page definition" and "form definition", for example in that, in the AFP resource, "page definition" is set where the table should be arranged on the logical page.

The AFP resources "page definition" and "form definition" stand highest in the hierarchy, meaning there is no AFP resource superordinate to them that accesses them. Therefore, they are called main resources.

It is clear from this specification that the generation of AFP resources and their integration into "page definitions" and "form definitions" represents a special case of the generation of a document template for print jobs cited in the claims.

When an AFP print application has been generated in the generation unit 10 of FIG. 1, all AFP resource files must be transmitted to the print server 18 before the printing. There they are stored in a storage 28 as what are known as local resources, transferred to the print server program 20 as the result of a print command, and, with likewise supplied variable data, processed by this into a print data stream 32 that can be processed by a printer (not shown) connected with the print server 18. However, if any of the AFP resources used by the print application should be missing in the storage 28, the print job can not be executed, and it amounts to interrupting delays until the missing AFP resource file is subsequently delivered. In conventional systems, the resource files used are manually transferred from the PC 14 to the storage 28 of the print server

18, and it happens again and again that a resource used by the print application was forgotten.

In order to circumvent this problem, the resource administration unit 12 was introduced. As soon as a new AFP print application is generated in the generation unit 10, this is registered in the resource administration unit 12. This thereupon generates a data index 33 (see FIG. 1) for this application in the storage area and reports this to the generation unit 10. When an operator has generated a new AFP resource with the aid of the generation unit 10 and wishes to store this, by default the generation unit 10 suggest to him in a dialog window to store the application data index 33 of the last registered application.

Together with each AFP resource, a corresponding resource part list is generated in which the resource files directly subordinate to it are entered. The resource part list is stored in the same index as the AFP resource itself.

Moreover, the resource administration unit 12 controls the transfer of all used AFP resources of the completed AFP print application to the print server 18. For this, it first generates a resource list in which the AFP resources used by the print application are listed. It recursively generates the resource list from the resource part list previously generated by the generation unit 10. Starting from the part lists of the AFP main resources ("page definition" and "form definition") that, like this, are stored in the application data index 34, it seeks the subordinate AFP resources listed in these part lists. It thereby uses a search scheme that is explained in particular below. If it has found these subordinate AFP resources, it looks up in their resource part lists whether these AFP resources, for their part, have subordinate AFP resources. All used AFP resources are thus recursively detected and entered into the resource list. In addition to the names of the AFP resource files, the paths to these files are noted in the resource list.

Using the resource list, the resource administration unit can then find in the storage area 16 all AFP resource files used by the print application and transmit them to the print server 18. It is thereby ensured that no used AFP resource files are missing in the storage 28 of the print server 18 when the print job corresponding to the AFP print application is started.

Figure 2:
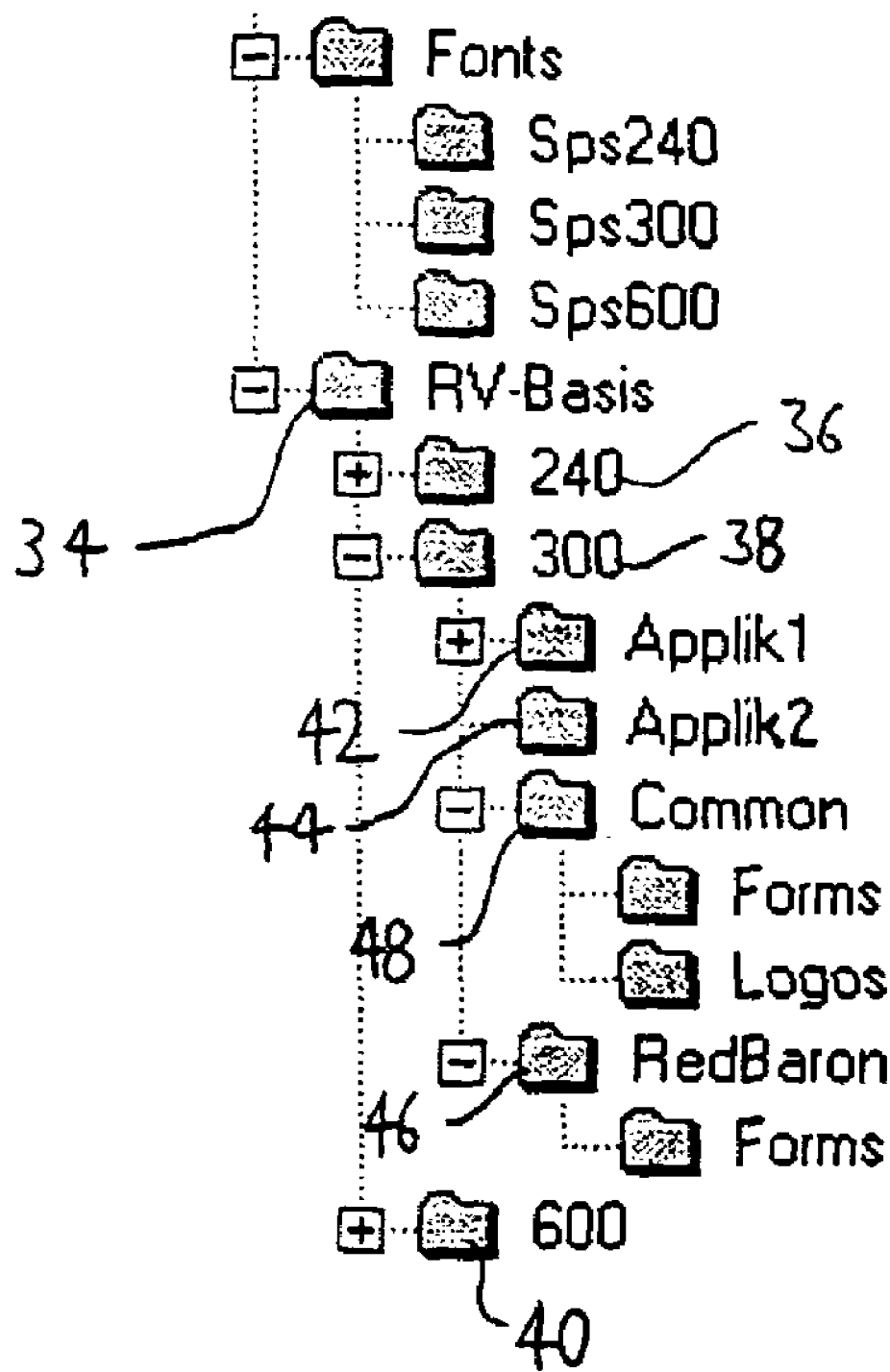
FIG. 2 illustrates an index structure for resource files.

A data structure is shown in FIG. 2 that was generated with the aid of the resource administration unit 12 in the storage area 16. There is at least one base index ("RV base") in the storage area 16. In the base index 34, three sub-indexes 36, 38 and 40 are located that correspond to available printer resolutions 240 dpi, 300 dpi and 600 dpi.

If, with the aid of the generation unit 10, a new AFP print application is generated for a specific degree of resolution, the resource administration unit 12 generates an application data index in which the sub-indexes 36, 38 or 40 corresponding to the resolution. In the exemplary embodiment of FIG. 2, the resource administration unit 12 has applied three application indexes 42, 44, 46 ("Applik1", "Applik2" and "RedBaron") in the sub-index 38 for print applications with a resolution of 300 dpi. Should an AFP resource generated or processed in the generation unit 10 now be stored, the resource administration unit 12 by default suggests to store the application data index of the last registered application.

In addition to the application indexes 42, 44 and 46, the resolution specific sub-index 38 comprises a common index 48 ("Common") in which AFP resource files that are commonly used by a plurality of applications can be stored. A typical example of commonly used AFP resource files are company logos that are required in different applications.

Although the resource administration unit 12 by default suggests the application data index of the last registered AFP print application for storage of AFP resource files, the user is not bound to this suggestion. In particular he is free to apply sub-indexes to the application data index in which the used AFP resource files are stored. However, the AFP main resources, meaning "page definition" and "form definitions" are stored directly in the application index.

For each stored AFP resource file, a corresponding resource part list is stored in the same index. The resource part list appropriately has the same file name as the resource file and is characterized by an ending (for example ".rsl").

In order to generate the resource list for a specific print application, the resource administration unit 12 first registers the AFP main resources stored in the application index. Using their resource part lists, they determine the file names of the directly subordinate resource files and seeks these in the storage area 16 according to the following plan:
1. search in the index of the current resource part list,
2. search in the superordinate application index,
3. search in a sub-index of the application index (search in alphabetical order),
4. search in common-sister index of the application index, and
5. search in a sub-index of the common index.

When the AFP resource file is found, it and its file path are entered into the resource list. It is then checked in the corresponding resource part list whether this AFP resource file, for its part, has subordinate AFP resource files. When this is the case, these are sought according to the same formula until all used AFP resource files are found and entered into the resource list. The resource list is thus generated combined, in that the used AFP resource files are determined recursively, starting from the AFP main resources, in that for each determined AFP resource file, the AFP resource files subordinate to it are determined with the aid of the corresponding resource part list.

In the case that an AFP resource file listed in a resource part list is not found according to the above formula, the resource administration unit 12 remembers the absence of the resource file and gives the operator the possibility to input the path to the AFP resource file by hand. Furthermore, there is the possibility to characterize an AFP resource as "external", which means that it is listed in the resource list but is not to be transmitted to the print server. Typical examples for external AFP resources are resources that are already present in the storage 28 of the print server 18 anyway, for example because they are used particularly frequently.

In the index structure of FIG. 2, the application indexes 42, 44 and 46 are subordinate to the resolution-specific sub-index. This index structure is reasonable when predominantly resolution-specific AFP resources are used.

However, recently resolution-independent AFP resources are increasingly used. Resolution-independent AFP resources still comprise no raster graphics, these being first generated in the printer from the resolution-independent AFP resources. When in large part resolution-independent AFP resources should be used, an index structure alternative to the representation of FIG. 2 is provided.

In this alternative index structure, the resolution-specific sub-indexes are subordinate to the application indexes and the common index. Resolution-independent AFP resources belonging to an application are then directly stored in the application index, while resolution-dependent AFP resources are stored at the application index in the sub-index corresponding to their resolution.

Figure 3:
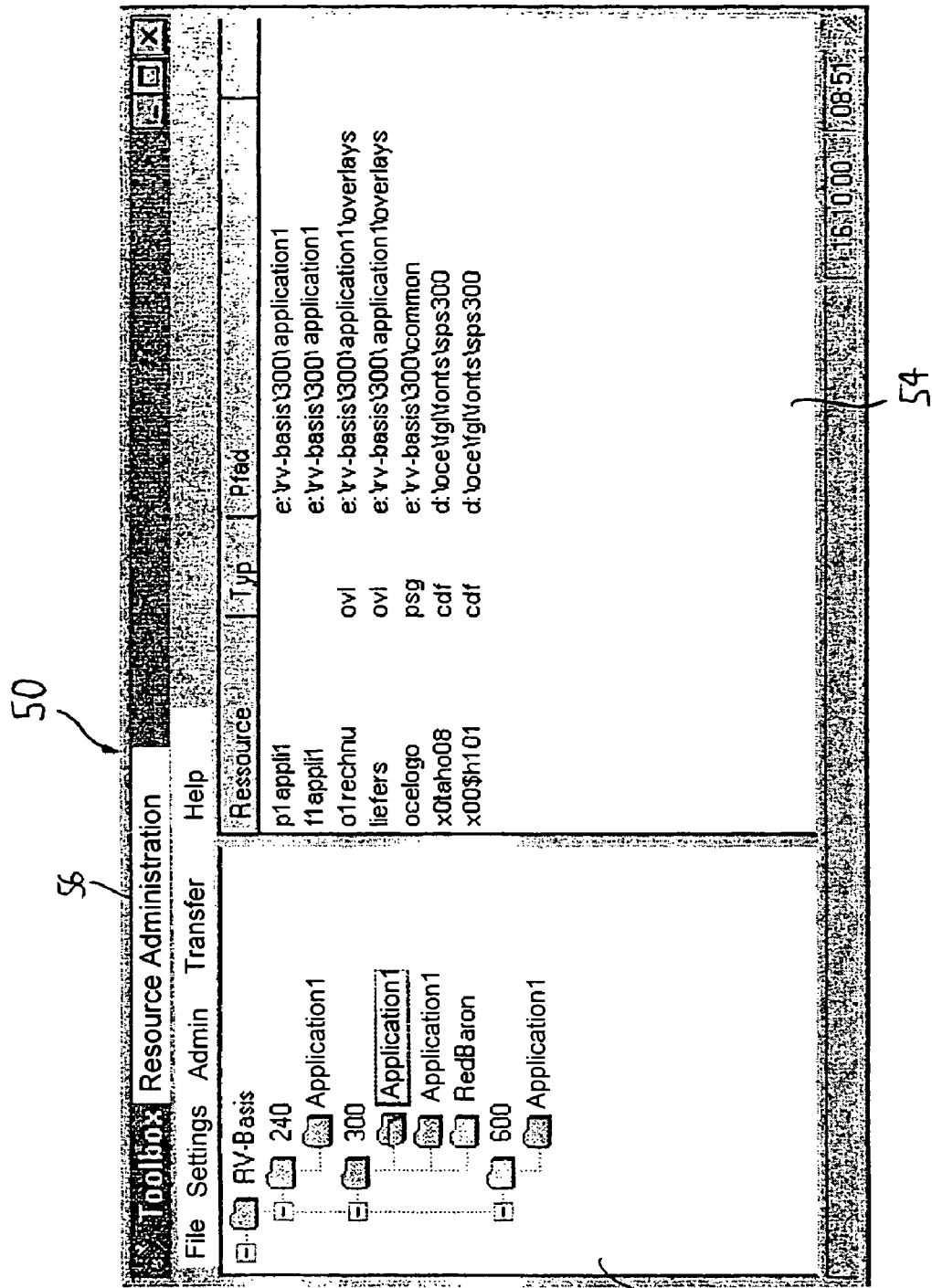
FIG. 3 illustrates a dialog window of a resource administration unit.

A dialog window 50 is shown in FIG. 3 that the resource administration unit 12 outputs to a screen (not shown in FIG. 1) connected with the PC 14. The dialog window 50 eases the transfer of the AFP resource files from the storage area 16 of the PC 14 to the print server 18. For this, the desired print application (in the example of FIG. 3 the "Application1") is selected only in the left part 52 of the dialog window 50 in which the stored data indexes stored in the storage area 16 are shown. After the Application1 was selected for the transfer, the resource administration unit 12 generates the resource list of the AFP resource files used in the Application1. In the case that the resource list was already generated at an earlier point in time, the resource administration unit 12 checks before the transfer whether all resource files of the resource list not characterized as external are actually present, and if necessary shows the absence of such a resource file.

The resource list is shown in the right section 54 of the dialog window 50. As is to be seen in FIG. 3, it comprises the main resources "p1appli1" ("page definition") and "f1appli1" (form definition) that are immediately stored in the application index "Application1" as is gleaned under the title "Path" in the right section 54 of the dialog window 50.

Furthermore, the Application1 uses an AFP resource "o1rechni" that is stored in a sub-index "overlays" for the application index "Application1". Although this AFP resource ("overlay") is not located directly in the application index "Application1", upon generation of the resource list it is found by the resource administration unit 12 according to the formula specified above. The same holds, for example for the AFP "page segment" resource "ocelogo" that isn't stored at all in the application data index, but rather in the corresponding common-sister index.

The dialog window 50 has a menu item 56 ("Transfer"), under which the operator of the print server can select to which the AFP resources are to be transferred. The resource administration unit 12 then control the transfer of the AFP resources listed in the resource list to the selected print server.

With the aid of the dialog window 50 of FIG. 3, an operator of the resource administration unit can request AFP resources to be provided and transferred to the print server 18. Since the operator arranges the AFP resource transfer, in this case from the PC 14, one thereby speaks of a "push operation".

However, in an alternative embodiment, the resource administration unit 12 can also be controlled from a superordinate computer program. In particular, the resource administration unit 12 can be queried via an intelligent printer driver (such as the Océ product SPS) installed on the print server 18 that provides the AFP resources and transfers them to the print server 18. Since the command to transfer hereby originates from the print server 18, one speaks of a "pull operation".

Moreover, the AFP resource files can be provided with a version identification or a generation datum. It can then be selectively provided and transferred according to its version identification. Thus, for example, it can be ensured that the current version of an AFP resource is available.

Although a preferred exemplary embodiment is shown and specified in detail in the drawings and in the previous specification, this should not be viewed as being purely exemplary, and the invention should not be viewed as limited. It is to be noted that only the preferred exemplary embodiments are shown and specified, and all changes and modifications that presently and in the future lie in the scope of protection of the invention should be protected.

We claim as our invention:

1. A method for generating a document template of a document for a print job, comprising the steps of:
    providing a computer at which a first computer program is loaded which provides a generation unit for generating document templates and a second computer program is loaded which provides a resource administration unit;
    providing a storage within said computer;
    generating the document template which is a general layout of the document by said generation unit using static resource data which comprises unchanging elements of the document for the document template that are combined into addressable computerized resource data sets;
    storing said resource data in a storage area of said storage;
    registering the document template by said resource administration unit;
    generating a resource list by the resource administration unit in which resource data sets of said static resource data used by the document template are listed;
    marking at least one of said resource data sets in the resource administration unit as being external when it is not to be transmitted to a print server device;
    using the resource list, transferring with the resource administration unit those resource data sets used by the document template and not marked as being external from said storage area of said computer to said print server device where they are stored;
    transferring a print command for the document to the print server device;
    supplying variable data independent from the resource data sets to the print server device; and
    then with the print server device controlling printing of the document for the print job by using the locally stored resource data sets of said document template, supplemented with said variable data, said variable data being data which changes from document to document within the print job while the static resource data remains the same from document to document within the print job.

2. The method according to claim 1 wherein the static resource data concern at least one of the following objects: fonts, forms, tables, standard texts, graphic elements, layout specifications for print pages and specifications for positioning of print pages on a recording medium.

3. The method according to claim 1 wherein the transfer of the resource data sets is controlled by the resource administration unit.

4. The method according to claim 1 wherein the resource data sets are formed via resource files.

5. The method according to claim 4 wherein at least one data index is arranged by the resource administration unit for storage of the used resource files.

6. The method according to claim 1 wherein a community index is arranged by the resource administration unit for resource files that are used in common by a plurality of document templates.

7. The method according to claim 4 wherein for each used resource file that, for its part, access at least one subordinate resource file, a resource part list is generated in which a minimum of one subordinate resource file is listed.

8. The method according to claim 7 wherein the resource part list is stored in a same index in which a cited resource file is located.

9. The method according to claim 7 wherein the resource part lists are generated by the generation unit.

10. The method according to claim 4 wherein such resource files that are accessed by no superordinate resource file are characterized as a main resource, and their resource part lists are stored for said resource administration unit such that they can be found.

11. The method according to claim 7 wherein to generate the resource list, the various resource files are recursively determined starting from the main resources, in that for each determined resource file the resource files subordinate to it are determined with aid of a corresponding resource part list.

12. The method according to claim 4 wherein it is noted in the resource list whether a listed resource file accesses at least one subordinate resource file.

13. The method according to claim 4 wherein at least one of storage addresses and paths to the listed resource files are listed in the resource list.

14. The method according to claim 1 wherein for a framework of the transfer of the resource files to the data processing device, it is automatically checked by the resource administration unit whether all resource files of the corresponding resource list not characterized as external are actually present, and if necessary absence of such resource file is displayed.

15. The method according to claim 1 wherein the resource administration unit is called via a superordinate computer program for at least one of to provide resource data sets and to transfer them to the data processing device.

16. The method according to claim 15 wherein the superordinate program is formed via a printer driver.

17. The method according to claim 1 wherein the resource data sets are provided with at least one of a version identification and a generation datum, and the resource datasets are at least one of provided and transferred to the data processing device by the resource administration unit according to at least one of their version identification and their generation datum.

18. A system for generating a document template of a document for a print job, comprising:
   a computer at which a first computer program is loaded which provides a generation unit for generating document templates and a second computer program is loaded which provides a resource administration unit;
   a storage within said computer;
   a computerized generation unit in which the document template which is a general layout of the document is generated by using static resource data which comprises unchanging elements of the document for the document template, whereby the static resource data are combined into addressable resource datasets and wherein the resource data sets are stored in a storage area of said storage;
   a computerized resource administration unit that generates a resource list in which the resource data sets used by the document template are listed and that marks at least one of said resource data sets in the resource administration unit as being external when it is not to be transmitted to a print server device;
   the resource administration unit, by using the resource list, controlling a transfer of those resource data sets which are not marked as being external to said print server device where they are stored;
   a job editor unit transferring a print command for the document to the print server device;
   said print server device being enabled to receive variable print data independent from the resource data sets, and
   said print server device upon receiving said print command controlling a printing of the document for the print job by using the locally stored resource data sets of said document template and said data sets supplemented with said variable data, said variable data being data which changes from document to document within the print job while the static resource data remains the same from document to document within the print job.

19. The system according to claim 18 wherein the generation unit and the resource administration unit are formed via computer programs that are installed on a common PC.

* * * * *